US009981855B2

(12) United States Patent
Wenk et al.

(10) Patent No.: US 9,981,855 B2
(45) Date of Patent: May 29, 2018

(54) PROCESS FOR PREPARING SCALENOHEDRAL PRECIPITATED CALCIUM CARBONATE

(71) Applicant: Omya International AG, Oftringen (CH)

(72) Inventors: Joe Wenk, Kingsport, TN (US); George Saunders, Brandon, VT (US); Marc Maurer, Village-Neuf (FR); Mathieu Skrzypczak, Terrace Park, OH (US)

(73) Assignee: Omya International AG, Oftringen (CH)

( * ) Notice: Subject to any disclaimer, the term of this patent is extended or adjusted under 35 U.S.C. 154(b) by 0 days. days.

(21) Appl. No.: 14/873,924

(22) Filed: Oct. 2, 2015

(65) Prior Publication Data

US 2016/0023915 A1   Jan. 28, 2016

Related U.S. Application Data

(62) Division of application No. 14/379,110, filed as application No. PCT/US2013/032923 on Mar. 19, 2013, now Pat. No. 9,428,398.

(60) Provisional application No. 61/614,644, filed on Mar. 23, 2012.

(30) Foreign Application Priority Data

Apr. 13, 2012 (EP) .................................. 12164041

(51) Int. Cl.
  *C01F 11/18* (2006.01)
  *D21H 17/67* (2006.01)
  *D21H 19/38* (2006.01)

(52) U.S. Cl.
  CPC ............ *C01F 11/181* (2013.01); *C01F 11/18* (2013.01); *D21H 17/675* (2013.01); *D21H 19/385* (2013.01); *C01P 2004/03* (2013.01); *C01P 2004/39* (2013.01); *C01P 2004/52* (2013.01); *C01P 2004/61* (2013.01); *C01P 2006/12* (2013.01)

(58) Field of Classification Search
  CPC ....................................................... C01F 11/18
  See application file for complete search history.

(56) References Cited

U.S. PATENT DOCUMENTS

| 3,320,026 A | 5/1967 | Waldeck |
| 5,232,678 A | 8/1993 | Bleakley et al. |
| 5,342,600 A | 8/1994 | Bleakley et al. |
| 5,558,850 A | 9/1996 | Bleakley et al. |
| 6,251,356 B1 | 6/2001 | Mathur |
| 6,294,143 B1 | 9/2001 | Deutsch et al. |
| 6,699,318 B1 | 3/2004 | Virtanen |
| 7,744,688 B2 | 6/2010 | Skuse et al. |
| 8,002,887 B2* | 8/2011 | Rainer ................ C01F 11/18 106/464 |
| 8,778,294 B2* | 7/2014 | Hansen ................ C01F 11/18 422/234 |
| 2005/0089466 A1 | 4/2005 | DeGenova et al. |
| 2007/0169905 A1 | 7/2007 | Yamashita et al. |
| 2011/0158890 A1 | 6/2011 | Gane et al. |

FOREIGN PATENT DOCUMENTS

| JP | 02137720 A | 5/1990 |
| JP | 0673689 A | 3/1994 |
| JP | 06271313 A | 9/1994 |
| JP | 09309723 A | 12/1997 |
| JP | 2008142951 A | 6/2008 |
| JP | 2011073891 A | 4/2011 |
| JP | 2011225390 A | 11/2011 |
| WO | 0058217 A1 | 10/2000 |
| WO | 03050355 A1 | 6/2003 |
| WO | 2004108597 A1 | 12/2004 |
| WO | 2006134080 A1 | 12/2006 |

OTHER PUBLICATIONS

International Search Report dated Jun. 17, 2013 for PCT Application No. PCT/US2013/032923.
Written Opinion of the International Searching Authority dated Jun. 17, 2013 for PCT Application No. PCT/US2013/032923.
Office Action dated Jun. 12, 2015 for Australian Application No. 2013235257.
Search Report dated Jun. 2, 2015 for Chinese Application No. 201380015854.0.
European Search Report dated Sep. 25, 2012 for European Application No. 12164041.1.
Office Action dated Aug. 12, 2015 for Korean Application No. 10-2014-7028622.
Zhao, XP-002682862 dated May 9, 2012.
Office Action for CO 14-190921-4.
Office Action dated Mar. 28, 2017 for JP 2016-031715.
Office Action dated Jun. 12, 2017 for EP 13764704.6.
Grant Decision for RU 2014142635.
Office Action dated Dec. 3, 2015 for CA 2,865,647.
Office Action dated Mar. 4, 2016 for CN 201380015854.0.
Search Report dated Jun. 2, 2015 for CN 201380015854.0.

(Continued)

*Primary Examiner* — Stuart Hendrickson
(74) *Attorney, Agent, or Firm* — Amster, Rothstein & Ebenstein LLP

(57) ABSTRACT

The present invention provides a process for preparing a precipitated calcium carbonate product. The process comprises the steps of preparing slaking quick lime to obtain slaked lime; and subjecting the slaked lime, without agitation, without prior cooling in a heat exchanger, and in the absence of any additives, to carbonation with carbon dioxide gas to produce PCC. The newly prepared product develops better performance thanks to improved resistance during processing.

20 Claims, 3 Drawing Sheets

(56) References Cited

OTHER PUBLICATIONS

Office Action dated Oct. 27, 2015 for JP 2015-501844.
Office Action for MX/a/2014/011125.

* cited by examiner

PROCESS FOR PREPARING SCALENOHEDRAL PRECIPITATED CALCIUM CARBONATE

CROSS-REFERENCE TO RELATED APPLICATIONS

This is a divisional of Ser. No. 14/379,110, filed Aug. 15, 2014, which is a National Phase of PCT Application No. PCT/US2013/032923, filed Mar. 19, 2013 and which claims priority to U.S. Provisional Application No. 61/614,644, filed Mar. 23, 2012 and European Application No. EP12164041.1, filed Apr. 13, 2012, the contents of which are hereby incorporated herein by reference in their entirety.

FIELD OF INVENTION

The present invention relates to a method for producing a precipitated calcium carbonate and, in particular, a precipitated calcium carbonate product in substantially scalenohedral form.

BACKGROUND OF THE INVENTION

In recent years calcium carbonate has found a wide array of uses across many fields. For example, calcium carbonate is one of the most widely used minerals in the paper, plastic, paint and coating industries both as a filler and, due to its white color, as a coating pigment. In the paper industry calcium carbonate is valued for its high brightness, opacity and gloss and is commonly used as a filler to make bright opaque paper. In addition, calcium carbonate is frequently used as an extender in paints and is also used as a filler in adhesives, sealants and plastics. High grade calcium carbonate has also found uses in formulations of pharmaceuticals.

Calcium carbonate is known to exist as natural occurring minerals as well as a synthetically produced products.

"Ground natural calcium carbonate (GNCC)" in the meaning of the present invention is a calcium carbonate obtained from natural sources including marble, chalk or limestone or dolomite. Calcite is a carbonate mineral and the most stable polymorph of calcium carbonate. The other polymorphs of calcium carbonate are the minerals aragonite and vaterite. Aragonite will change to calcite at 380-470° C., and vaterite is even less stable. Ground calcium carbonate is processed through a treatment such as grinding, screening and/or fractionizing by wet and/or dry, for example, by a cyclone. It is known to the skilled person that ground calcium carbonate can inherently contain a defined concentration of magnesium, such as it is the case for dolomitic limestone.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

Among these forms, the scalenohedral form of calcite is particularly desirable for use as a bulking pigment in the paper industry because it is relatively inexpensive to produce and it has desirable light scattering properties.

Generally, one way to produce calcium carbonate commercially is by calcining crude limestone to obtain quicklime. Water is then added to yield an aqueous suspension of calcium hydroxide ("milk of lime"), and carbon dioxide is reintroduced into this slurry to precipitate the calcium carbonate. The product of this process is known as precipitated calcium carbonate ("PCC"). The resulting aqueous suspension, or slurry, of calcium carbonate may be used as is or further processed (e.g., dewatered, grinded, etc.) to form a dry product. The precipitation reaction is capable of producing each of the three polymorphs (calcite, aragonite and vaterite) depending on the exact reaction conditions used.

Prior art processes for producing scalenohedral PCC product typically rely on the use of additives such as monosaccharides (e.g, simple sugars such as fructose, glucose), disaccharides (e.g., sucrose, maltose, lactose), polysaccharides (e.g, starch, cellulose, glycogen), triethanolamine, mannitol, diethanolamine, bicine, morpholine, tri-isopropanolamine, N-ethyl diethanolamine, N,N-diethylethanolamine, sodium boroheptonate, or reagents including a polyhydric alcohol or a polyhydric phenol, during the slaking of the quick lime or prior to carbonation (see, e.g., U.S. Pat. Nos. 6,294,143, 5,232,678 and 5,558,850).

Conventional processes for preparing scalenohedral PCC also typically cool the slaked lime before carbonation (see, e.g., U.S. Pat. Nos. 3,320,026 and 6,251,356).

In addition, conventional processes for preparing scalenohedral PCC utilize agitation during carbonation (see, e.g., U.S. Pat. Nos. 3,320,026, 5,232,678, 5,342,600, 5,558,850 and 6,251,356).

In the manufacture of paper, and particularly woodfree paper, there is a desirability of increasing the filler content to achieve higher bulk, and at the same time, increasing the stiffness of the produced/obtained paper. However, one of the downsides of conventional scalenohedral PCC is that it may not be as strong as required in the manufacture of paper, and particularly uncoated woodfree paper. Accordingly, there exists a need for a low cost process for producing precipitated PCC in the scalenohedral form that is stronger than conventional scalenohedral PCC, that permits an increase in the filler content and density without sacrificing stiffness or bulk of the produced paper.

SUMMARY OF THE INVENTION

The present invention provides a process for producing low cost precipitated PCC in the scalenohedral form that has a stronger resistance of the PCC clusters/crystals during processing (i.e. lesser tendency to form discrete PCC particles), and leads to improved stiffness and/or bulk in woodfree paper applications than conventional scalenohedral PCC. In its general form, the present invention accomplishes these requirements by utilizing a two stage manufacturing process. The first stage includes the step of slaking quick lime to obtain slaked lime. The second stage includes the step of subjecting the slaked lime, without agitation, without prior cooling in a heat exchanger, and in the absence of any additives, to carbonation with carbon dioxide gas to produce PCC.

As will be discussed in the examples below, the product of this two stage process overcomes the deficiencies of prior PCC production processes and results in a scalenohedral PCC product that has a stronger resistance of the PCC clusters/crystals during processing (i.e. lesser tendency to form discrete PCC particles), and leads to improved stiffness and/or bulk in woodfree paper applications than conventional scalenohedral PCC.

The present invention also provides a PCC or PCC product prepared by the process of the present invention.

In addition, the present invention provides a material comprising the PCC or PCC product of the present invention. The material may include, for example, products in which it is desirable to include calcium carbonate as a filler, such as paper, paper coatings, paper products, inks, paints, coatings, plastics, adhesives, building products, foodstuffs, cosmetics and pharmaceutical products.

The present invention also provides a paper coating comprising the PCC or PCC product of the present invention. The PCC or PCC product of the present invention is believed to result in higher gloss and improved opacity.

Finally, the present invention is directed to uses of the PCC or the PCC product of the present invention for the manufacture of a material in which it is desirable to use scalenohedral PCC as a filler.

Additional objects of the invention will be apparent from the description which follows.

DETAILED DESCRIPTION OF THE INVENTION

Figure 1:
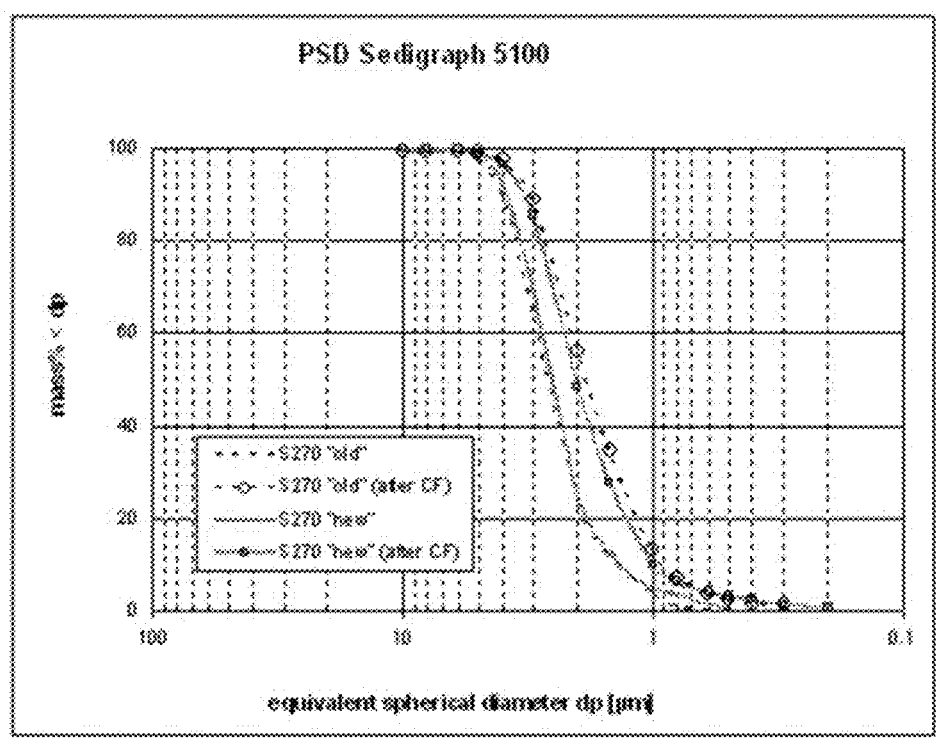
FIG. 1 represents a graph of the particle size distribution comparing the PCC prepared in accordance with the conventional process (old) with the PCC prepared in accordance with the present invention (new) both before and after centrifugation (after CF).

In accordance with the present invention, a precipitated calcium carbonate product is prepared in a two-stage process. In the first stage, quick lime (CaO) is slaked in water to obtain a calcium hydroxide ($Ca(OH)_2$) slurry, or milk of lime. This reaction is shown in reaction (1) and preferably takes place in a slaker tank:

$$CaO + H_2O \rightarrow Ca(OH)_2 + \text{heat} \quad (1)$$

The source of quick lime (CaO) used in the slaking reaction is preferably obtained by subjecting crushed limestone to heat (calcination) to form lime (CaO) and carbon dioxide ($CO_2$). The reaction is preferably performed at an initial temperature of about 85° F. to 120° F., and preferably 95° F. to 110° F. Since the reaction is exothermic, the temperature typically raises to 180° F. to 210° F., and preferably to 195° F. to 205° F. The reaction also is desirably performed with mixing or agitation. The duration of the reaction may vary but is typically about 5 to 15 minutes. The solids content of the slurry is typically about 10 to 20 wt.-% solids, and preferably 12 to 18 wt.-% solids. It is within the confines of the present invention that additional water may be introduced during the slaking reaction in order to control and/or maintain and/or achieve the desired solids concentration.

The calcium hydroxide slurry or slaked lime from the slaking reaction may then be screened if desired in order to remove oversize particles. A suitable screen can include, for example, a screen having an about 30-50 mesh screen size. The calcium hydroxide slurry or slaked lime may then be transferred to an intermediate tank if desired. As a result of air cooling, the temperature of the calcium hydroxide slurry or slaked lime is then reduced by about 40° F. to 70° F., and more preferably about 60° F., resulting in slurry temperature of 125° F. to 165° F., and preferably 135° F. to 155° F. However, contrary to conventional processes for preparing PCC, the calcium hydroxide slurry or slaked lime is not subjected to cooling in a heating exchanger prior to carbonation. In this regard, conventional processes for preparing PCC typically cool the calcium hydroxide slurry or slaked lime to 90° F. to 120° F. in a heating exchanger prior to carbonation.

In the second stage, the calcium hydroxide slurry or slaked lime is then subjected to carbonation with carbon dioxide gas to produce PCC. This carbonation step is shown in reaction (2), and takes place in a reactor:

$$Ca(OH)_2 + CO_2 \rightarrow CaCO_3 + H_2O + \text{heat} \quad (2)$$

Contrary to conventional processes, the calcium hydroxide slurry or slaked lime is not subjected to agitation during the carbonation reaction as is done in conventional processes for preparing PCC. As used herewith, "without agitation" means the agitator of the reactor is turned off. The absence of agitation is believed to slow the reaction and the development of the PCC scalenohedral crystal.

In addition, contrary to methods for preparing PCC in the prior art, the carbonation is conducted in the absence of any additives. As used herein, the "absence of any additives" means the absence of any additives that may be added prior to or during carbonation, including additives that may be added during the slaking of the quick lime or the resulting calcium hydroxide slurry. Such additives include, for example, a carbohydrate, a monosaccharide, a disaccharide, a polysaccharide, triethanolamine, mannitol, diethanolamine, bicine, morpholine, tri-isopropanolamine, N-ethyl diethanolamine, N,N-diethylethanolamine, sodium boroheptonate, or reagents including a polyhydric alcohol or a polyhydric phenol, or any mixture thereof. Preferably, the absence of any additive means the absence of a monosaccharide or a disaccharide, and most preferably, the absence of any additive means the absence of a disaccharide (e.g., sucrose).

In accordance with the present invention, the carbon dioxide ($CO_2$) is selected from gaseous carbon dioxide, liquid carbon dioxide, solid carbon dioxide or a gaseous mixture of carbon dioxide and at least one other gas, and is preferably gaseous carbon dioxide. When the $CO_2$ is a gaseous mixture of carbon dioxide and at least one other gas, then the gaseous mixture is a carbon dioxide containing flue gas exhausted from industrial processes like combustion processes or calcination processed or alike. $CO_2$ can also be produced by reacting an alkali- and/or earth alkali carbonate with acid. Furthermore, it can be produced by the combustion of organics, such as ethyl alcohol, wood and the like, or by fermentation. When a gaseous mixture of carbon dioxide and at least one other gas is used, then the carbon dioxide is present in the range of 8 to about 99% by volume, and preferably in the range of 10 to 25% by volume, for example 20% by volume. Preferably, the $CO_2$ is obtained from an external source, and is more preferably captured from the calcination of the crushed calcium carbonate. The carbonation reaction is preferably conducted at an initial temperature of 130° F. to 160° F., and more preferably at an initial temperature of 135° F. to 145° F. The medium particle size of the calcium carbonate can be controlled by adjusting the starting temperature upwards or downwards 1-2° F. The reaction desirably precedes until all or substantially all of the calcium hydroxide or slaked lime has been converted into calcium carbonate slurry. In the preferred embodiment, the reaction is stopped when the conductivity of the reaction mixture increases.

The PCC slurry obtained from the carbonation reaction is then isolated. This is preferably accomplished by transferring the PCC slurry to a holding tank. The PCC slurry may then be subjected to additional processing steps, including, for example, screening, dewatering, dispersion and/or grinding steps to obtain a PCC product having desired characteristics. In the preferred embodiment, the PCC slurry is passed through one or more screens in order to remove larger particles. In the more preferred embodiment, the PCC slurry is passed through a screen to separate particles >45 microns or particles >75 microns.

The resulting PCC product preferably contains 85% or more scalenohedral particles, and more preferably 90% or more scalenohedral particles, and most preferably 95% or more scalenohedral particles.

The resulting PCC product also preferably has a medium particle size ($d_{50}$) of 2.0 to 3.0 microns, and more preferably a medium particle size ($d_{50}$) of 2.2 to 2.8 microns, and most preferably a medium particle size ($d_{50}$) of 2.5 microns. Throughout the present application, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ greater than 0.5 μm, a Sedigraph 5100 device from the company Micromeritics, USA can be used.

The resulting PCC product also preferably has a BET surface area of 4.0 to 7.0 $m^2/g$.

The PCC product obtained in accordance with the process of the present invention has a stronger resistance of the PCC clusters/crystals during processing (i.e. lesser tendency to form discrete PCC particles), and leads to improved stiffness and/or bulk in woodfree paper applications than PCC products prepared using conventional processes.

If the PCC is subjected to dewatering, dispersion and/or grinding steps, these steps may be accomplished by procedures known in the art. With respect to grinding, the PCC product may be dry ground and/or wet ground. Wet grinding refers to grinding the PCC in a liquid medium (e.g., slurry). Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Drying may take place using any suitable drying equipment and can, for example, include thermal drying and/or drying at reduced pressure using equipment such as an evaporator, a flash drier, an oven, a spray drier (such as a spray drier sold by Niro and/or Nara), and/or drying in a vacuum chamber. Dispersants also can be included to prepare dispersions if desired.

The PCC or PCC product produced according to the present invention may be used in various materials in which it is desirable to use calcium carbonate as a filler. For example, the scalenohedral PCC or PCC product may be used in the pharmaceutical field with products such as medicines, in human or animal foodstuffs, in the papermaking field as a filler or in the coating of paper, in water-based or non-water-based paints, in plastics, or in printing inks (e.g., offset printing, rotogravure printing). Preferably, the PCC or PCC product is used as a filler in paper, and more preferably as a filler in uncoated woodfree paper. In this regard, the PCC product of the present invention offers an improvement over conventional PCC in uncoated wood free paper, by allowing better bulk (+5-10%), higher opacity and stiffness than conventional PCC.

When used in the coating of paper, the PCC or PCC product of the present invention is believed to result in higher gloss and improved opacity.

The present invention is described in the following examples which are set forth to aid in the understanding of the invention, and should not be construed to limit in any way the invention as defined in the claims which follow.

EXAMPLES

Particle Size Distribution (Mass % Particles with a Diameter <X) and Weight Medium Diameter ($d_{50}$) of Mineral Material.

In all of the following examples, the weight median diameter and the particle size distribution characteristics of the mineral material were determined via the sedimentation method, i.e. an analysis of sedimentation behavior in a gravimetric field. The measurement was made using a Sedigraph™ 5100 of Micromeritics Instrument Corporation.

The method and the instrument are known to the skilled person and are commonly used to determine grain size of fillers and pigments. The measurement was carried out in an aqueous solution of 0.1 wt.-% $Na_4P_2O_7$. The samples were dispersed using a high speed stirrer and supersonics.

Specific Surface Area (SSA) of a Material.

The specific surface area was measured via the BET (Brunauer, Emmett, Teller) method according to ISO 9277 using nitrogen, following conditioning of the sample by heating at 250° C. (482° F.) for a period of 30 minutes. Prior to such measurements, the sample was filtered, rinsed and dried at 90 to 100° C. (194 to 212° F.) in an oven for at least 12 hours before being broken down in a mortar with a pestle, and then placed in a mass balance at 130° C. (266° F.) until a constant weight was observed.

Example 1

Preparation of Conventional PCC

Conventional PCC was prepared as follows. First, burnt lime was reacted with water at a temperature of about 185 to 210° F. in a slaker to obtain slaked lime. Next, course grits were separated from the slaked lime and dumped to waste. The slaked lime was then collected in a buffer tank and pumped through a heat exchanger to cool the slurry, and then into an intermediate tank. Thereafter, sugar was added to the slaked lime. The cooled slaked lime was then transferred to a reactor set at an initial temperature of >135° F. Carbon dioxide from the host paper mill's lime kiln was then introduced into the bottom of the reactor with the agitators turned on to convert the slaked lime into calcium carbonate slurry. The calcium carbonate slurry was then screened to remove particles >45 microns, and resulting product was then pumped into a storage tank. Two products were prepared using this process by varying the carbonation start temperature. One product had a medium particle size ($d_{50}$) of a 2.5 micron, a BET specific surface area of 4.9 $m^2$/g, and a $d_{75}/d_{25}$ of 1.49. The other product had a medium particle size ($d_{50}$) of 2.9 micron, a BET specific surface area of 3.8 $m^2$/g, and a $d_{75}/d_{25}$ of 1.44.

Example 2

Preparation of PCC According to the Invention

The PCC according to the present invention was prepared as in Example 1 with the following differences. First, the slaked lime was not pumped through a heat exchanger to cool the slurry. Second, sugar was not added to the slaked lime. Third, the carbonation reaction was performed with the agitators turned off. The product prepared by this process had a medium particle size ($d_{50}$) of 2.5 micron, a BET specific surface area of 4.7 $m^2$/g, and a $d_{75}/d_{25}$ of 1.5.

Example 3

Handsheet Testing

The conventional PCC from Example 1 and the PCC according to the present invention from Example 2 were used to prepare handsheets for further testing. More specifically, the handsheets were prepared by first combining 80% hardwood pulp with 20% softwood pulp to achieve a 100% pulp mix. Hanksheets were then made using 80% of the pulp and 20% of either the conventional PCC or the PCC according to the present invention. The handsheets were then subjected to the following tests.

Gurley Porosity.

This test measured the time for a 100 cc of air to pass through a paper sample, and used a Gurley-Hill Porosity Meter (Model 4190)(Gurley Precision Instruments, New York) in accordance with Tappi T460 om-96.

Scott Bond Test.

This test measured the internal fiber bond strength of paper, and gave an indication of expected performance of the strength in the Z direction. This test was performed with the Scott Internal Bond Tester (Model # B, version AV-2) (Huygen Corporation, Illinois) in accordance with Tappi T569.

Taber Stiffness.

This tests evaluated the stiffness and resiliency of paper, and used a Tabler V-5 Stiffness Tester (Model #150B) (Teledyne/Taber Inc., New York) in accordance with Tappi T-543 pm-84.

Tensile Strength.

This test measured the maximum tensile strength developed at rupture, and more specifically, the force per unit width required to break a paper sample. This test used the Instron Testing System (Model #1011)(Instron Corporation, Massachusetts) in accordance with Tappi T-498 om-88.

The results of the testing are presented in Table 1. As can be seen, a handsheet prepared from the PCC according to the present invention had improved stiffness (as determined using the Scott Bond test, the Tabor stiffness test, and tensile strength test) at a higher buck density than handsheets prepared from the conventional PCC products.

TABLE 1

PCC Handsheet Testing

| | | Comparative Example 1 (2.5 mps) | Comparative Example 1 (2.9 mps) | PCC according to invention Example 2 |
|---|---|---|---|---|
| Basis weight | | | | |
| Basis weight | g/$m^2$ | 72.0 | 71.9 | 72.2 |
| Basis weight | lb/3300 $ft^2$ | 48.8 | 48.6 | 48.8 |
| Brightness | | | | |
| R457 TAPPI | % | 88.5 | 89.5 | 89.4 |
| Standard deviation | | 0.2 | 0.3 | 0.2 |
| Caliper | | | | |
| Thickness | Thousandths of inch | 5.00 | 4.70 | 4.60 |
| Standard deviation | | 0.20 | 0.10 | 0.10 |
| Specific Volume | $cm^3$/g | 1.76 | 1.66 | 1.62 |
| Bulk density | g/$cm^3$ | 0.57 | 0.60 | 0.62 |
| Filler | | | | |
| Filler content | % | 21.30 | 21.50 | 19.90 |
| Gurley Porosity | | | | |
| Porosity | s | 3.9 | 5.1 | 4.7 |
| Standard deviation | | 0.2 | 0.6 | 0.5 |
| Opacity | | | | |
| Opacity | % | 88.3 | 89.6 | 88.4 |
| Standard deviation | | 0.7 | 0.3 | 0.3 |
| Corrected opacity | % | 88.7 | 90.0 | 88.8 |
| Scott Bond | | | | |
| Scott Bond | ft-lb/$in^2$ | 64 | 61 | 78 |
| Standard deviation | | 5 | 7 | 3 |
| Taber Stiffness | | | | |
| Bending resist 15° | TU | 1.91 | 2.23 | 2.33 |
| Standard deviation | | 0.31 | 0.28 | 0.26 |
| Tensile strength | | | | |
| Tensile strength | lbs/in | 8.0 | 8.4 | 9.8 |
| Standard deviation | | 0.3 | 0.2 | 0.4 |
| Breaking length | km | 1.98 | 2.09 | 2.42 |
| Tensile index | Nm/g | 19.4 | 20.5 | 23.7 |

Example 4

Resistance Testing

The PCC prepared by the conventional process ("old PCC") and the PCC prepared by the process of the present invention ("new PCC") were subjected to a resistance test involving centrifugation, which subjects the PCC to stress forces due to centrifugal effect and the shear effect generated by the differential speed of the rotor. The parameters of the testing were as follows:
Batch size: 500 Liter
Time operation ~60 minutes
centrifuge type, model: KHD Humboldt SC01
cone angle: 10°
drum diameter: 268 mm
pool depth: 168 mm rot. speed: 4450 min-1
diff. rot speed: 41 min-1
feed rate: 400 l/h
motor nominal current: 28 A
motor nominal power: 15 kW The particle size distribution was determined for the old PCC and the new PCC, both before and after centrifugation. The results are shown in Table 2 below and in FIG. 1. As shown in Table 2 and FIG. 1, the new PCC generated less fines than the old PCC after being subjected to centrifugation. For example, as a result of centrifugation, the old PCC generated an increase of 56% of particles having a dp<2 μm, while the new PCC generated an increase of 48.9% of particles having a dp<2 μm. For dp<1.5 μm, the old PCC generated an increase of 34.6% of particles having a dp<1.5 μm, while the new PCC generated an increase of 27.8% of particles having a dp<1.5 μm. For dp<1.0 μm, the old PCC generated an increase of 13% of particles having a having a dp<1 μm, while the new PCC generated an increase of 10.1% particles having a dp<1 μm. The reduction in fines for the new PCC in comparison to the old PCC as a result of centrifugation demonstrates that the new PCC has a stronger resistance of the PCC clusters/crystals during processing than the old PCC.

TABLE 2

PSD Measurements

| Mass % < dp | 0.2 | 0.3 | 0.4 | 0.5 | 0.6 | 0.8 | 1 | 1.5 | 2 | 3 | 4 | 5 | 6 | 8 | 10 |
|---|---|---|---|---|---|---|---|---|---|---|---|---|---|---|---|
| S270 "old" | | | | 0.3 | 0.1 | 0.9 | 4 | 12.2 | 24.2 | 64.4 | 89.9 | 97.4 | 99.1 | 99.6 | 99.5 |
| S270 "old" (after CF) | | 1.2 | 1.6 | 2.6 | 3.6 | 7.1 | 13 | 34.6 | 56 | 88.7 | 97.4 | 99.1 | 99.3 | 99.4 | 99.5 |
| S270 "new" | | | | 0.5 | 1.6 | 3.4 | 4.9 | 12.2 | 24.9 | 69.2 | 91.9 | 98 | 99.3 | 99.2 | 99.1 |
| S270 "new" (after CF) | 0.6 | 1.2 | 2.5 | 3.2 | 4 | 6.2 | 10.1 | 27.8 | 48.2 | 85.5 | 96.6 | 98.9 | 99.6 | 99.8 | 99.9 |

Figure 2:
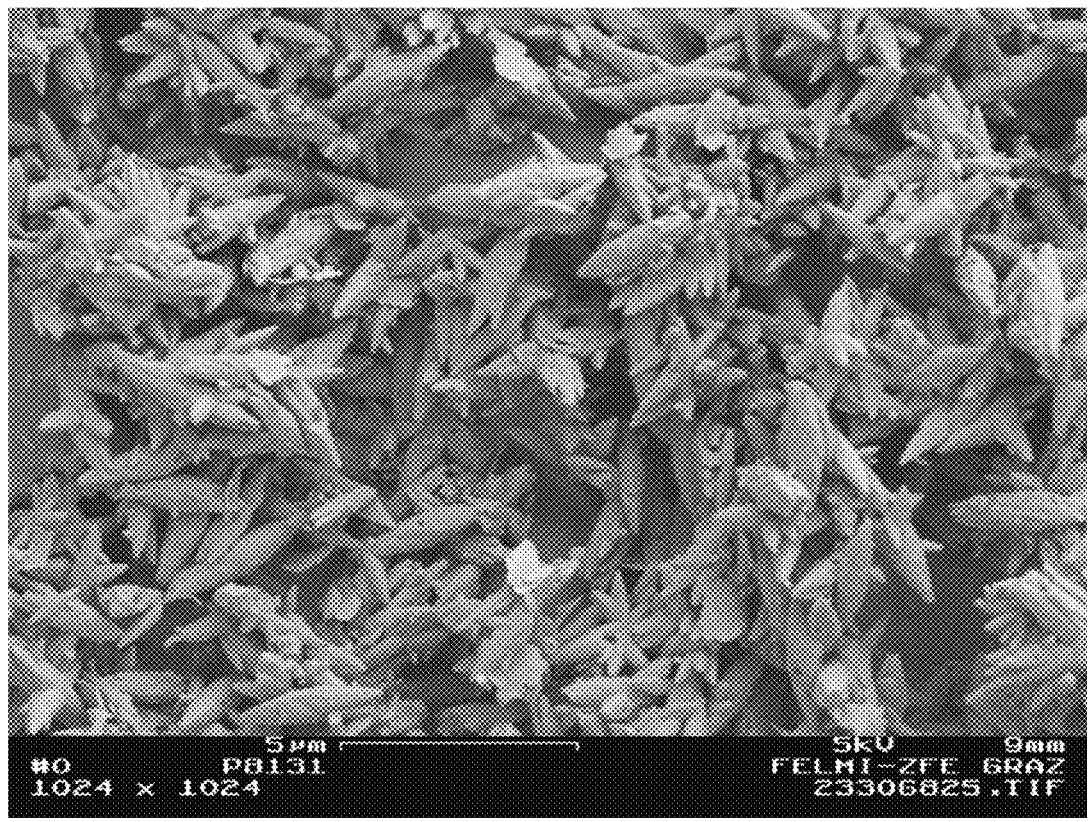
FIG. 2 represents an SEM photograph taken of the PCC prepared in accordance with the present invention before centrifugation.
Figure 3:
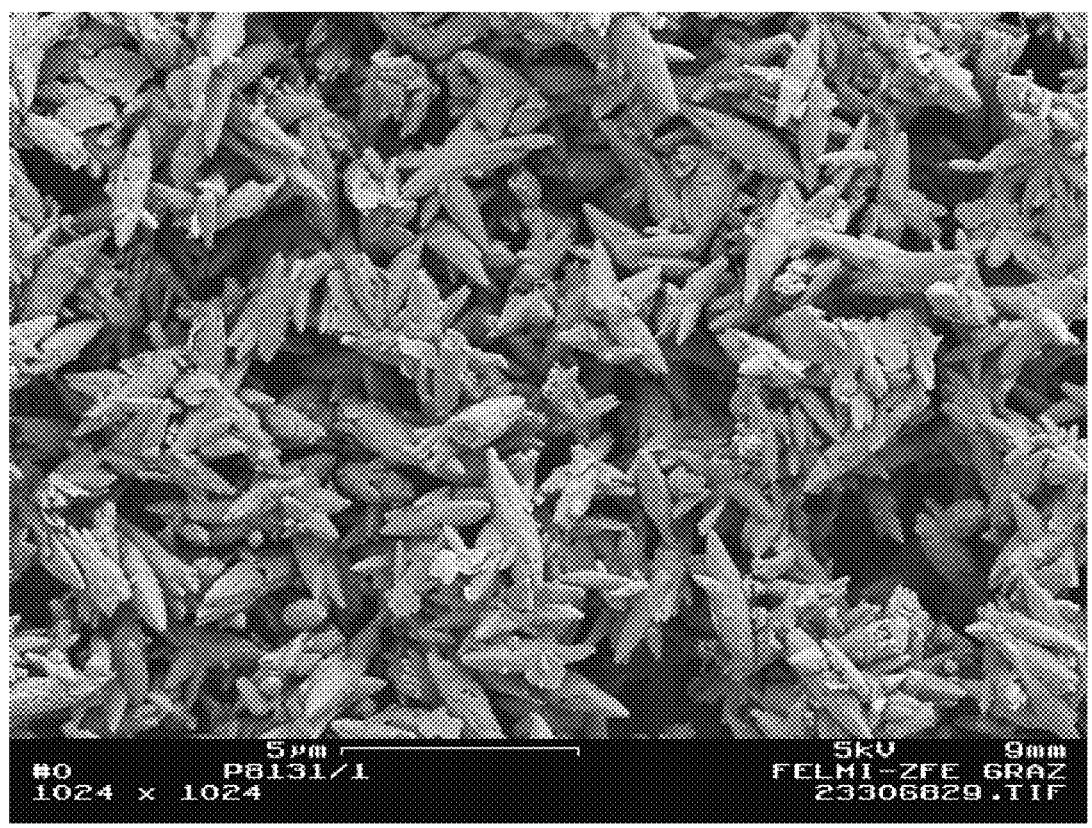
FIG. 3 represents an SEM photograph taken of the PCC prepared in accordance with the present invention after centrifugation.

In addition, SEM photographs of the new PCC before and after centrifugation are shown in FIGS. 2 and 3, respectively. Samples before and after centrifugation look qualitatively the same, i.e. no observable reduction of the particle size. Therefore, it can be concluded that the inventive PCC has a stronger resistance of the PCC clusters/crystals to the conditions experienced during processing.

All publications mentioned herein above are hereby incorporated in their entirety. While the foregoing invention has been described in detail for the purpose of clarity and understanding, it will be appreciated by one skilled in the art from a reading of the disclosure that various changes in form and detail can be made without departing from the true scope of the invention in the appended claims. All changes that come within the meaning and range of equivalency of the claims are therefore intended to be embraced therein.

The invention claimed is:

1. A precipitated calcium carbonate (PCC) product produced by the process comprising the steps of:
   (a) slaking quick lime to obtain slaked lime;
   (b) subjecting the slaked lime, without agitation, without prior cooling in a heat exchanger, and in the absence of any additives, to carbonation with carbon dioxide gas to produce PCC; and
   (c) subjecting the PCC obtained in step (b) to one or more screening, dewatering, dispersion and grinding steps to obtain a PCC product containing 85% or more scalenohedral particles, having a medium particle size ($d_{50}$) of 2.5 microns, a $d_{75}/d_{25}$ of 1.5, a BET surface area of 4.7 m$^2$/g, and no additives, wherein the PCC product, when subjected to centrifugation, generates less fines than a PCC product prepared by subjecting slaked lime, with agitation, with prior cooling in a heat exchanger, and in the presence of additives, to carbonation with carbon dioxide gas.

2. The PCC product according to claim 1, wherein step (a) is performed at an initial temperature of 85° F. to 120° F.

3. The PCC product according to claim 1, wherein step (a) is performed at an initial temperature of 95° F. to 110° F.

4. The PCC product according to claim 1, wherein the temperature of the reaction in step (a) raises to 180° F. to 210° F.

5. The PCC product according to claim 1, wherein the temperature of the reaction in step (a) raises to 195° F. to 205° F.

6. The PCC product according to claim 1, wherein step (a) is performed with mixing or agitation.

7. The PCC product according to claim 1, wherein slaked lime obtained in step (a) has a solids content of 10 to 20% solids.

8. The PCC product according to claim 1, wherein slaked lime obtained in step (a) has a solids content of 12 to 18% solids.

9. The PCC product according to claim 1, which further comprises subjecting the slaked lime obtained in step (a) to screening.

10. The PCC product according to claim 1, wherein as a result of air cooling, the temperature of the slaked lime obtained in step (a) is reduced by 40° F. to 70° F., prior to carbonation in step (b).

11. The PCC product according to claim 1, wherein the slaked lime obtained in step (a) is not subjected to cooling in a heating exchanger prior to carbonation in step (b).

12. The PCC product according to claim 1, wherein the carbonation reaction in step (b) is conducted at an initial temperature of 130° F. to 160° F.

13. The PCC product according to claim 1, wherein the carbonation reaction in step (b) is conducted at an initial temperature of 135° F. to 145° F.

14. The PCC product according to claim 1, wherein the PCC obtained in step (b) is isolated.

15. The PCC product according to claim 1, containing 90% or more scalenohedral particles.

16. The PCC product according to claim 1, containing 95% or more scalenohedral particles.

17. A material comprising the PCC product according to claim 1.

18. The material according to claim 17, wherein the material is a paper, a paper coating, a paper product, an ink, a paint, a coating, a plastic, an adhesive, a building product, a foodstuff or a pharmaceutical product.

19. The material according to claim 18, which is paper.

20. The material according to claim 18, which is uncoated woodfree paper.

\* \* \* \* \*